(12) United States Patent
Atwood et al.

(10) Patent No.: US 6,353,193 B1
(45) Date of Patent: Mar. 5, 2002

(54) ELECTRONIC WHITEBOARD SYSTEM AND METHOD

(75) Inventors: Stephen Atwood, Worcester, MA (US); Bernard Geaghan, Salem, NH (US)

(73) Assignee: Greensteel, Inc., Norcross, GA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/941,353

(22) Filed: Sep. 30, 1997

Related U.S. Application Data

(60) Provisional application No. 60/027,617, filed on Oct. 1, 1996.

(51) Int. Cl.$^7$ ............................................... G08C 21/00
(52) U.S. Cl. .............................. 178/20.02; 178/18.01; 178/18.02; 178/18.03
(58) Field of Search ........................... 345/173, 174, 345/175, 179; 178/18.01, 18.02, 18.03, 18.05, 18.06, 18.07, 18.08, 20.01, 20.02

(56) References Cited

U.S. PATENT DOCUMENTS

| | | | | |
|---|---|---|---|---|
| 4,711,977 A | * | 12/1987 | Miyamori | 178/18 |
| 5,023,408 A | * | 6/1991 | Murakami | 345/173 |
| 5,157,737 A | * | 10/1992 | Sklarew | 345/173 |
| 5,579,036 A | * | 11/1996 | Yates, IV | 345/173 |
| 5,607,312 A | * | 3/1997 | Zhou | 434/411 |
| 5,638,093 A | * | 6/1997 | Takahashi | 345/179 |

* cited by examiner

*Primary Examiner*—Vijay Shankar
(74) *Attorney, Agent, or Firm*—Todd Deveau; Ryan A. Schneider; Troutman Sander LLP

(57) ABSTRACT

An eraser for use on an electronic whiteboard with a protrusion area on the erasing surface forming a convex area on the erasing surface for establishing a positive point of contact with the whiteboard; an electronic whiteboard system including such an eraser, a controller for storing data relating to information written on and erased from the whiteboard data, and a filter for preventing the storage of digital data relating to contacts with the whiteboard not attributable to normal writing or erasing actions.

28 Claims, 8 Drawing Sheets

ELECTRONIC WHITEBOARD SYSTEM AND METHOD

RELATED INVENTIONS

This application claims the benefit of provisional application Serial No. 60/027,617 filed Oct. 1, 1996.

FIELD OF INVENTION

This invention relates to an electronic whiteboard system and method, and more particularly to a novel eraser for use on an electronic whiteboard, a data filtering control system for use in conjunction with an electronic whiteboard and a method of filtering errant data associated with electronic whiteboards.

BACKGROUND OF INVENTION

Electronic whiteboards are currently gaining favor in the market place because they provide for electronic recordation of all figures, words and characters handwritten on the whiteboard for later printout, review, and/or transmission. Typical electronic whiteboards include a resistive membrane stretched over a rigid substrate, an electronics module for determining the position of the instrument such as a pen used to write on the whiteboard and a computer for processing and storing the coordinates of the pen as it moves over the whiteboard. Examples of currently available electronic whiteboard systems include those marketed by Smart Technology, Inc. of Calgary, Canada and Microfield Graphics, Inc. of Beaverton, Oreg. See also U.S. Pat. Nos. 3,911,215; 4220,815; and 5,220,136.

Note that electronic whiteboard technology is different from copy whiteboards which are only capable of making copies of the material written on the whiteboard at discrete times during the presentation. In contrast, electronic whiteboards have the capability to display handwritten writing on the surface of the whiteboard and to also store digital data representing the handwritten writing during the complete presentation.

Currently available electronic whiteboards, however, suffer from a few serious short comings. For example, Smart Technology's whiteboard system includes an erase function to eliminate or mark erased digital data but the user is required to select an erase mode, draw circle around the writing to be erased, and then select an erase command. The digital data representing the writing within the circle on the whiteboard is then digitally erased or marked. Still, the user must then use an eraser to physically erase the writing on the surface of the whiteboard. Obviously, this time consuming and awkward process is a serious departure from the normal way erasing occurs on a typical blackboard and thus the user must be provided with detailed instructions regarding how to properly erase the stored digital information, and the audience must patiently wait for the presenter to complete all the erasing functions before the presentation can resume.

One reason for this complex erasing methodology in the prior art is the fact that most erasers currently used are rectangular in shape and thus their area of coverage is dependent on the orientation of the eraser on the whiteboard. Another reason for this complex methodology is due to the fact that most erasers currently used are flat. Since the typical user may alternately presses lightly and then more firmly and/or rock the erasure from side to side during each erase stroke, it is difficult for the electronics to accurately detect where and how much of the eraser surface is actually touching the whiteboard.

Another shortcoming in current electronic whiteboards systems is the data integrity problems which occur due to inadvertent contacts with the whiteboard. For example, user may be writing with a pen in one hand on one part of the whiteboard and then place his or her hand on another portion of the whiteboard for balance. The whiteboard electronics may accurately record the pen movement but will also erroneously record the contact of the user's hand with the whiteboard surface as a writing event. The same type of data corruption can occur due to electronic noise generated by outside influences beyond the control of the electronics portion of the whiteboard system. At printout or transmission, the corrupted data will thus not accurately match the actual writing on the whiteboard.

SUMMARY OF INVENTION

It is therefore an object of this invention to provide an improved electronic whiteboard system.

It is a further object of this invention to provide an improved whiteboard data processing and filtering method.

It is a further object of this invention to provide an improved method of erasing writing on a whiteboard.

It is a further object of this invention to provide such a system and such methods which allow the user to erase both the physical writing and erase or mark the electronic data representing the physical writing in an ergomonically sound manner.

It is a further object of this invention to provide such a system and such methods which allow the user to erase the physical writing and the electronic data representing the writing without the need to invoke an erase function, draw a circle around the information to be erased, invoke an erase command, and then physically erase the actual writing on the whiteboard.

It is a further object of this invention to provide such a system and such methods which automatically detect and then filter out inadvertent contacts with the whiteboard surface not properly attributable to writing or erasing by the user.

It is a further object of this invention to provide such a system and such methods which automatically eliminate erroneous data.

It is a further object of this invention to provide a novel eraser for use on an electronic whiteboard which provides positive position information.

It is a further object of this invention to provide such an eraser which is orientation independent.

This invention results from the realization that many of the data recording errors associated with writing and erasing actions on an electronic whiteboard can be eliminated by use of a circular and therefore orientation independent eraser with a central pointed protrusion which insures a positive initial contact of the eraser with the whiteboard; and/or also by the use of an electronic filter which detects and filters out data relating to contacts with the whiteboard not predictably associated with normal writing or erasing actions; and further that the filter constraints need to be changed and usually relaxed somewhat for erasing actions since people use an eraser in a fashion different than they use a writing instrument. This invention results from the further realization that the cumbersome prior art whiteboard erasing function wherein the user must first draw a circle around the writing to be erased in order for that writing to be electronically deleted can be eliminated by the use of the above described circular eraser with the central protrusion in conjunction with software or firmware which detects the occurrence of the user erasing the actual writing on the whiteboard and then simultaneously and automatically also erases or marks the stored electronic data representing the actual writing thereby rendering the electronic whiteboard more user friendly since writing and erasing, from the viewpoint of the user, occur just as if the user was writing on a chalkboard.

This invention features an electronic whiteboard system comprising: an electronic whiteboard; an eraser; means for storing data relating to information on and erased from the whiteboard; and means for simultaneously associating with the data an indication that the data is erased data as the eraser erases writing on the whiteboard relating to the data. The eraser may include an erasing surface with at least one convex area. The erasing surface is typically circular shaped with a radius r and the means for simultaneously associating includes means for marking as erased data all writing on the whiteboard under the erasure within r of the convex area.

This invention features a control system for an electronic whiteboard, the control system comprising: means for detecting and storing the location coordinates of an object on the whiteboard as it moves across the whiteboard; and filtering means, responsive to the means for detecting, including means for calculating the distance between first and second sequential location coordinates, means for determining the time interval between the first and second sequential location coordinates, means for comparing the calculated distance to a pre-established allowable maximum distance for the time interval, and means for rejecting the second location coordinate if the calculated distance is greater than the pre-established maximum allowable distance for the time interval to filter out inadvertent contacts with the whiteboard.

The filtering means may further include means for computing the change in velocity between three sequential coordinates, and means for rejecting the third velocity between three sequential coordinates, and means for rejecting the third coordinate if the change in velocity in velocity is greater than a pre-established maximum allowable change in velocity. The control system may further means for inputting the type of object to be moved across the whiteboard and means for changing the maximum allowable change in velocity depending on the type of object.

In the preferred embodiment, the control system further includes means for generating a first sound for a first type of object (i.e. a pen) and a second sound for a second type of object (i.e. an erasure) to provide positive feedback to the user of the whiteboard regarding the type of action occurring on the whiteboard.

The pre-established maximum allowable distance is usually between about 0.2 and 2 inches for a time interval of approximately 5 milliseconds. The pre-established maximum allowable change in velocity is typically about between 40 and 120 inches per second squared when the instrument type is a writing instrument and between about 320 and 960 inches per second squared when the instrument type is an erasing instrument.

The means for determining the location coordinates usually includes means for computing the Cartesian coordinates of the object. The means for calculating the distance includes means for computing the distance in the x direction and the distance in the y direction between the first and second sequential location coordinates and the pre-established maximum allowable distance then includes a maximum allowable x distance and a maximum allowable y distance.

The means for computing also includes means for calculating the change in velocity in the x and y directions. The pre-established allowable maximum change in velocity then includes a maximum allowable change in velocity in the x and y directions, and thus the means for rejecting the third coordinate includes means for excluding the third coordinate if either the maximum change in velocity in the x direction or the y direction is exceeded.

Stated another way, this invention features an electronic filter for an electronic whiteboard comprising: first rejection means, responsive to sequential contacts on the whiteboard which exceed a maximum allowable distance within an established time period, for rejecting at least one of the contacts; and second rejections means, responsive to sequential contacts on the whiteboard which exceed an established maximum allowable change in velocity, for rejecting at least one of the contacts. The control method for an electronic whiteboard of this invention features detecting the storing the location coordinates of an object on the whiteboard as it moves across the whiteboard; and filtering certain errant contacts with the whiteboard wherein filtering includes: calculating the distance between first and second sequential location coordinates, determining the time interval between the first and second sequential location coordinates, determining the time interval between the first and second sequential location coordinates, comparing the calculated distance to a pre-established allowable maximum distance for the time interval, and rejecting the second location coordinate if the calculated distance is greater than the pre-established maximum allowable distance for the time interval to filter out inadvertent contacts with the whiteboard.

Filtering may further include: computing the change in velocity between three sequential coordinates and rejecting the third coordinate if the change in velocity is greater than a pre-established maximum allowable change in velocity. Also added may be the step of inputting the type of object to be moved across the whiteboard, and then the maximum allowable change in velocity varies depending on the type of object. In a preferred embodiment, a first sound is generated for a first type of object type and a second sound is generated for a second type of object to provide positive feedback to the user of the whiteboard regarding the type of action occurring on the whiteboard.

An electronic filtering process according to this invention includes rejecting at least on of a plurality of sequential contacts on the whiteboard which exceed a maximum allowable distance between the contacts within an established time period and rejecting at least one of a plurality of sequential contacts on the whiteboard which exceed an established maximum allowable change in velocity between the contacts. This filtering process further includes the step of modifying the established maximum allowable change in velocity depending on the type of device contacting the whiteboard.

An electronic whiteboard system in accordance with this invention features a digitizer including a writing surface; control electronics for detecting and storing the location coordinates of an object on the whiteboard to keep a digital record of all writings and erasures on the whiteboard; and filter means for preventing the storage of digital data relating to contacts with the whiteboard not attributable to normal writing or erasing actions.

DISCLOSURE OF PREFERRED EMBODIMENT

Other objects, features and advantages will occur to those skilled in the art from the following description of a preferred embodiment and the accompanying drawings, in which.

Figure 1:
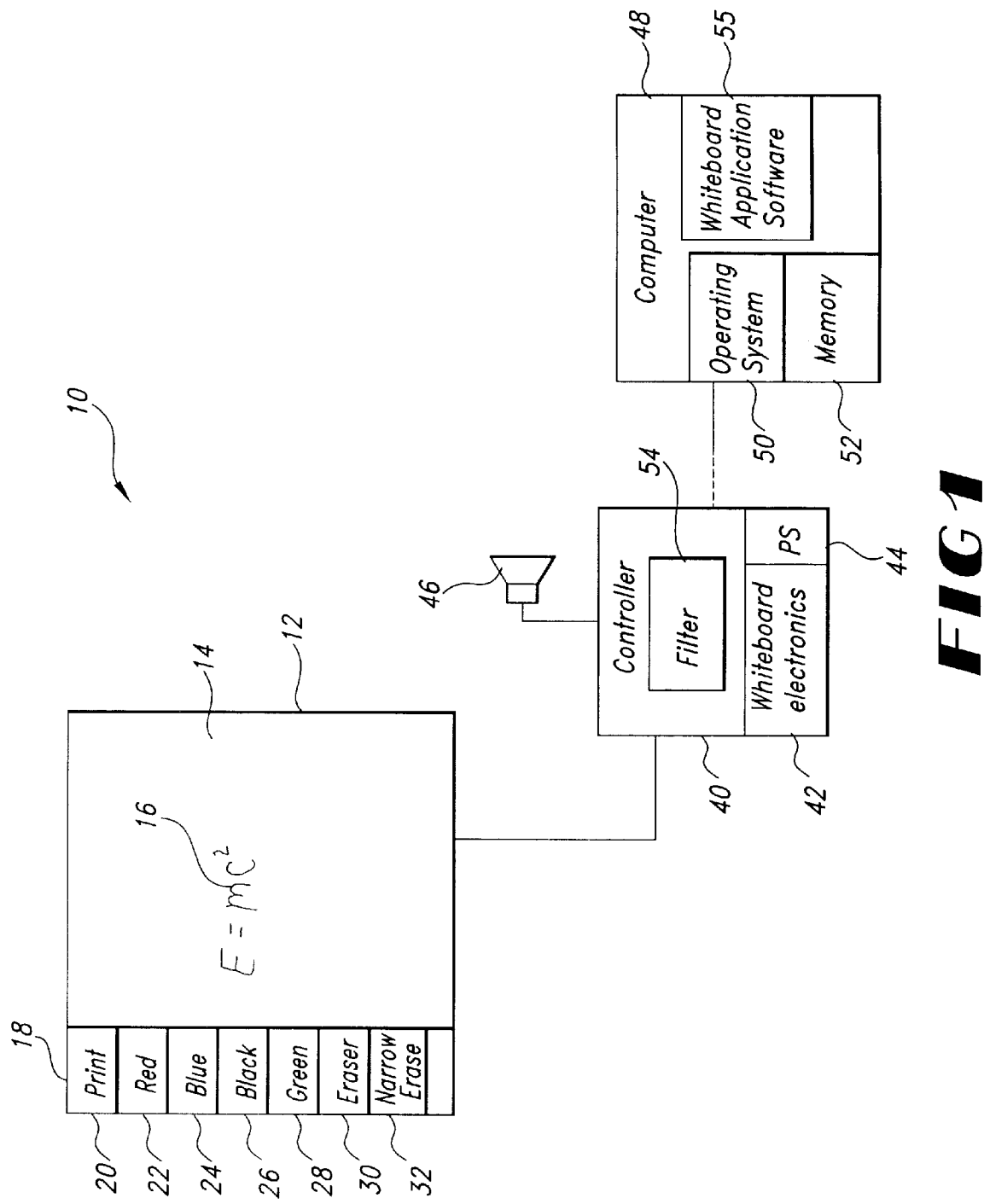
FIG. 1 is a block diagram showing the primary components of electronic whiteboard system of this invention.

Electronic whiteboard system 10, FIG. 1, of this invention includes digitizer 12 including writing surface 14 on which the user can write information including alphanumerical characters as shown at 16 and/or graphical illustrations useful, for example, in oral presentations. The typical electronic whiteboard of this type is usually about 2 feet long by 3 feet high. In accordance with this invention, portion 18 of the whiteboard is reserved for touch function "keys" where the user can select print function 20, red pen function 22, blue pen function 24, black pen function 26, green pen function 28, eraser function 30, and a narrow erase function 32. Red, blue, black, and green function 22–28 typically correspond to the color of the pen used to write information 16. Eraser function 30 corresponds to the use of the eraser of this invention discussed in more detail with reference to FIGS. 5–7 and narrow erase function 32 corresponds to the user using his or her finger or some other smaller object to erase a portion of the writing 16.

Connected to digitizer or whiteboard 12 is controller 40 which includes a whiteboard electronics package 42 which measures the x and y coordinates of the pen used by a user writing on surface 14 of whiteboard 12 and power supply 44. Also included as a part of controller 40 is speaker 46 discussed in more detail below.

Connected to controller 40 via, for example, an RS 232 connection is computer 48 including operating system 50 such as DOS, Windows, or the MacIntosch operating system with the appropriate capacity to operate the whiteboard application software 55. The application software provides services for storing and retrieving whiteboard data, updating the display screen, and setting user options/preferences. Computer 48 typically has some form of memory 52 for storing digital data representing the actual writing and drawing which occurs on surface 14 of whiteboard 12. Filter software or firmware 54 in accordance with this invention filters out errant contacts with surface 14 of whiteboard 12 not associated with normal writing or erasing actions by the user and is discussed in more detail with reference to FIGS. 13 and 14.

Figure 2:
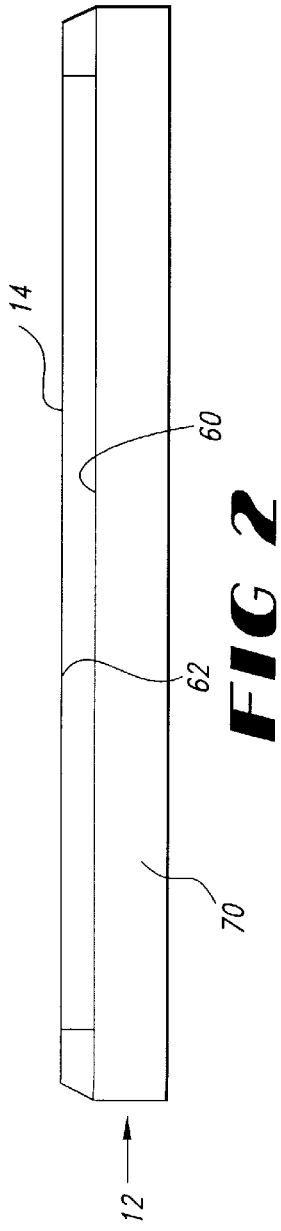
FIG. 2 is a side cutaway view of the digitizer portion of the electronic whiteboard system shown in FIG. 1.
Figure 3:
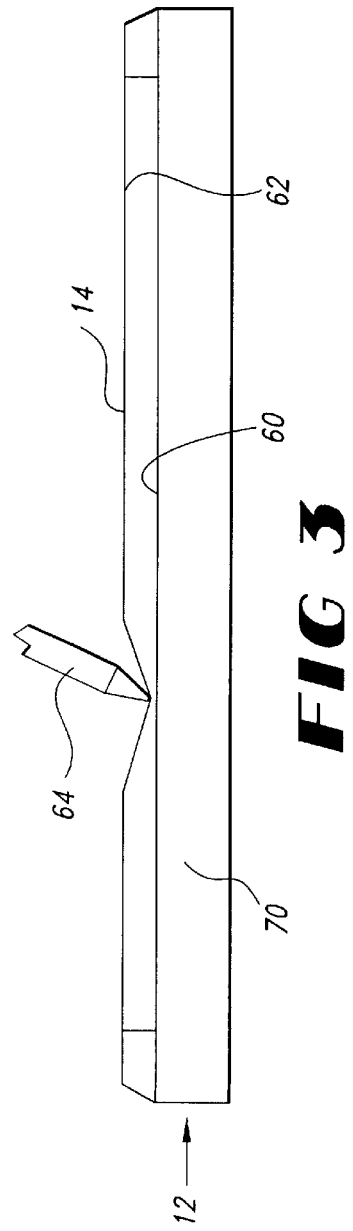
FIG. 3 is a side cutaway view showing the use of a writing instrument such as a pen in conjunction with the digitizer shown in FIG. 2.
Figure 4:
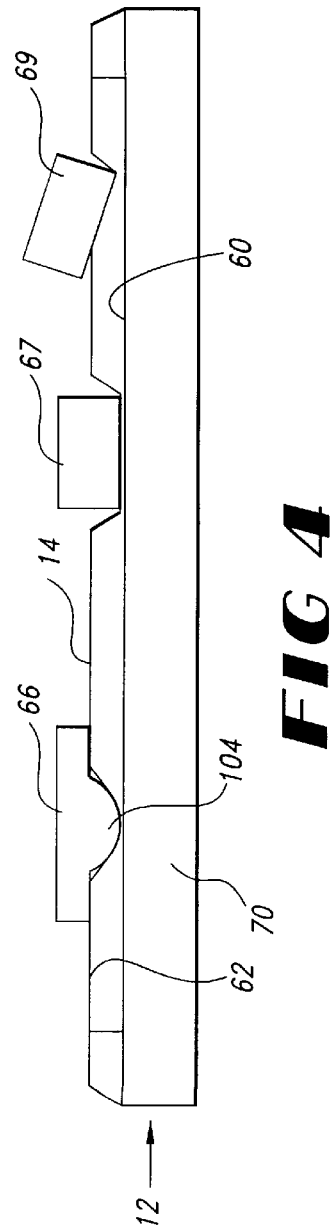
FIG. 4 is a side cutaway view showing the use of the eraser of this invention in conjunction with the digitizer shown in FIG. 2.

Whiteboard 12, FIG. 1 is shown in cross-section in FIG. 2 and typically includes an outer flexible membrane writing surface 14 and inner conductive surface 60 on substrate 70. The conductive inner surface 62 of writing surface and conductive surface 60 of substrate 70 are energized to a specific electrical potential by whiteboard electronics 42, FIG. 1 and as a user presses outer membrane writing surface 14, FIG. 2 with pen 64, FIG. 3 or eraser 66, FIG. 4 such that surface 62 comes into contact with surface 60, whiteboard electronics 42, FIG. 1 measures the voltage transferred from one surface to the other to determine the x and y Cartesian coordinates of the contact point.

Typically, flexible outer membrane writing surface 14 is manufactured in several layers each of different materials of construction. Conductive layer 62 may be made of carbon with a resistance value typically 400Ω per square. Outer layer 14 is not typically conductive and has properties which allow writing and erasing with standard whiteboard markers and also properties which allow the membrane to be stretched across the writing area and then flex when pressure is applied with a writing or erasing instrument. The preferable thickness of outer membrane 14 is 0.006 inches. Surface 60 is typically constructed from a conductive material such as carbon of 400Ω per square and is supported by substrate 70. The preferable thickness of inner surface 60 is 0.003 inches and supporting substrate is typically 0.75 inches thick.

Thus, whiteboards are used as presentation tools in the same manner as chalkboards with the significant exception that electronic whiteboards record everything written on them into a computer file stored in memory 52, FIG. 1 so that the user can record in real time the writing and erasures made during the use of the electronic whiteboard. Writing modes include the selection of pen color to be recorded in memory 52 which is required since the whiteboard has no means of detecting the color of the writing instruments The user presses red function area 22, to indicate that the next writing on the whiteboard surface is to be recorded in computer 48 as red. The user will typically then write on whiteboard surface 14 with a red marker. Prior to erasing, the user will press the eraser function 30 and all subsequent touch inputs on whiteboard surface 14 will be interpreted by whiteboard electronics 42 as eraser strokes with a width of approximately 3 inches. If the user presses narrow erase function area 32, subsequent inputs on whiteboard surface 14 are interpreted by whiteboard electronics 42 as eraser strokes with a 0.4 inch width. The narrow erase function allows electronic emulation of the common practice of a user using a finger tip to erase information.

The present invention features four primary components. The first, discussed with reference to FIGS. 5–8, is a novel eraser for use in conjunction with electronic whiteboard 12 and which provides a positive position indication to be interpreted by whiteboard electronics 42 and which is also orientation independent. Second is filter software/firmware 54 discussed with reference to FIGS. 9–14 which in general eliminates data errors both in the writing and erasing modes and the novel approach of changing the filter values depending on whether writing or erasing is occurring on whiteboard surface 14 to account for the physical differences in the way users write and erase information. Also provided is feedback to the user in the form of audio signals generated by whiteboard electronics 42 through speaker 46 to ergonomically provide the user with positive feedback concerning the writing and erasing functions. Also disclosed is the novel idea that the user can now erase surface 14 without having to draw a circle around the material to be erased and without having to select a number of function keys. In this invention, whiteboard electronics 42 in conjunction with filter software/firmware 54 simultaneously associates with any data to be erased an indication that the data is erased data as the user erases the writing on the whiteboard using an erasure. The electronic filter portion 54 of this invention may reside as a part of whiteboard electronics 42 and/or software/firmware in computer 48.

Figure 5:
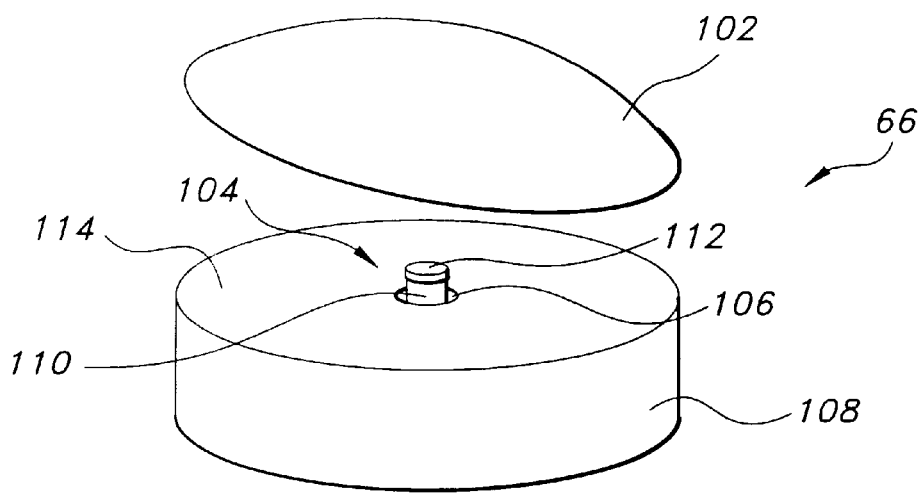
FIG. 5 is a schematic view of one embodiment of the eraser of this invention.

Eraser 66, FIG. 5, in accordance with this invention includes erasing surface 102 having at least one, normally central, protrusion in this embodiment formed by protruding member 104 residing in recess 106 of eraser body portion 108. Member 104 may include shaft portion 110 made of foam and cap portion 112 made of plastic. Body portion 108 is also typically made of foam such as Neoprene and surface 102 is typically a velvet like material having a dense carpet of short bristles typically 0.1 inch in length which are effective in wiping material from the whiteboard surface but which also bend under light erasing pressure to conform to the whiteboard surface. Other compliant materials such as soft cloth or felt may be used in place of the velvet like material 102 secured to surface 114 of body portion 108 by an adhesive.

Protrusion 104 has a typical height of approximately 0.15 inches and a diameter of 0.2 inches. Since body portion 108 of eraser 66 is constructed of foam, protrusion 104 initially asserts more force on the whiteboard surface than the surrounding portion of erasing surface 102 but as more erasing force is applied, protrusion 104 pushes into foam body 108 becoming recessed therein allowing the full area of surface 102 to contact the whiteboard surface. The primary purpose of protrusion 104 is to provide a positive and definite contact with eraser 108 on whiteboard surface 14, FIG. 1 such that whiteboard electronics 42 can accurately determine the location of eraser 66, FIG. 5 and therefore properly detect the information being erased.

Surface 102 is preferably circular to eliminate the need to properly orient the eraser in a predetermined manner and thus body portion 108 typically has a cylindrical shape. Preferably, protrusion 104 has a surface area much less than erasing surface 102. In an alternative embodiment, shaft like protrusion 104, FIG. 5, is replaced with nipple shaped protrusion 120, FIG. 6 adhered to neoprene foam layer 122 of body portion 124 and covered by erasing surface 126 and hollow-fill layer 128 forming the protrusion shown at 130. However, other possible protrusion forming shapes and structures are possible as shown at 140, FIG. 7. As shown in phantom at 142, no portion of the erasure surface flat and there is essentially a constant slope to the peak of protrusion area 144 wherein for the shape shown at 140 there is a shallow slope at 146 and then a steeper slope at 148 just prior to protrusion peak 144. The protruding portion, regardless of its actual configuration, provides a positive point of reference for whiteboard electronics 42, FIG. 1 when the eraser first strikes whiteboard surface 14 as compared to prior art flat erasers. Thus, any convex arching or bulging erasure surface formed in a variety of ways may be used. The typical diameter of the eraser is approximately 3 inches and when the user presses erase function 30, FIG. 1, all subsequent inputs on the whiteboard surface are interpreted as eraser strokes with a width of 3 inches. Protrusion 130, FIG. 6 is typically centrally located to ensure that the data is marked along the center of the eraser's path.

Figure 8:
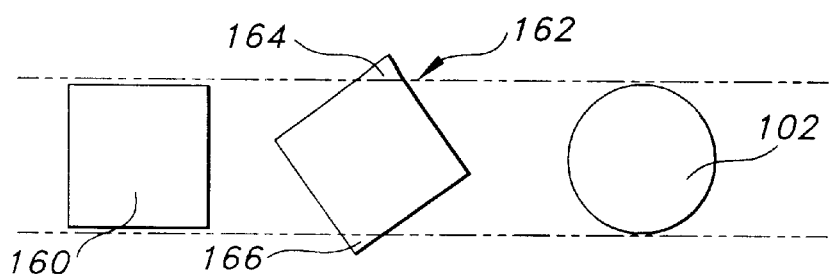
FIG. 8 is a schematic view showing the improvement of the use of a circular-shaped orientation independent erasing surface in accordance with the preferred embodiment of this invention as compared to prior art square or rectangular orientation dependent erasers.
Figure 9:
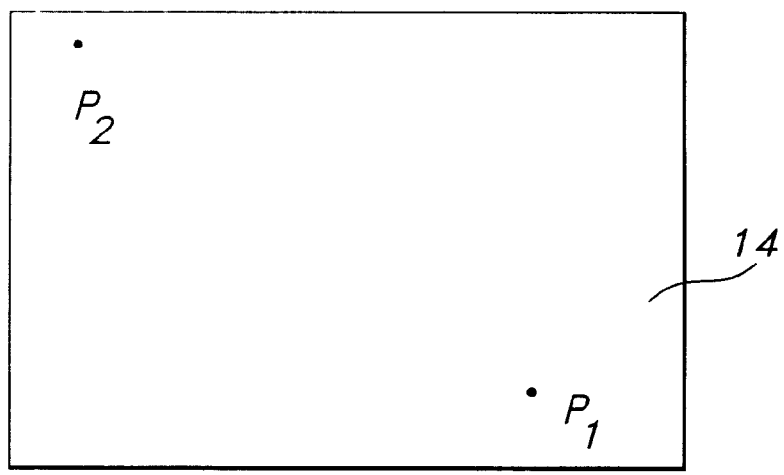
FIG. 9 is a graphical depiction of one type of an inadvertent contact with the whiteboard filtered out by the control system of this invention.

Because of its circular or cylindrical shape, the novel eraser of this invention is orientation independent. As shown in FIG. 8, a square or rectangular erasing surface as shown at 160 has a different area of coverage when angled as shown at 162 and whiteboard electronics 42 would be unable to correctly mark or erase data represented by writing in areas 164 and 166. This problem is exacerbated when the shape is rectangular. In this invention, however, as shown in FIG. 8, due to the use of circular shaped eraser surface 102, FIG. 5, the orientation of the eraser is irrelevant. A circular shaped surface is preferred because the position of eraser 66 on whiteboard surface 14, FIG. 1 is electrically measured by whiteboard electronics 42 by sensing the contact of writing surface 14 with surface 60, FIG. 4 as contact is made by protrusion 104. Since the radius of the erasure is known, all written information under the eraser is properly erased by marking all data within the radial distance of protrusion 104.

Figure 6:
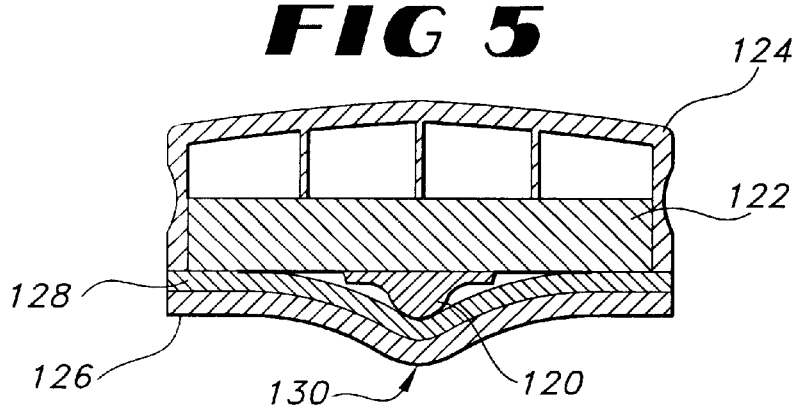
FIG. 6 is a cutaway view of another embodiment of the eraser for use on an electronic whiteboard in connection with this invention.
Figure 7:
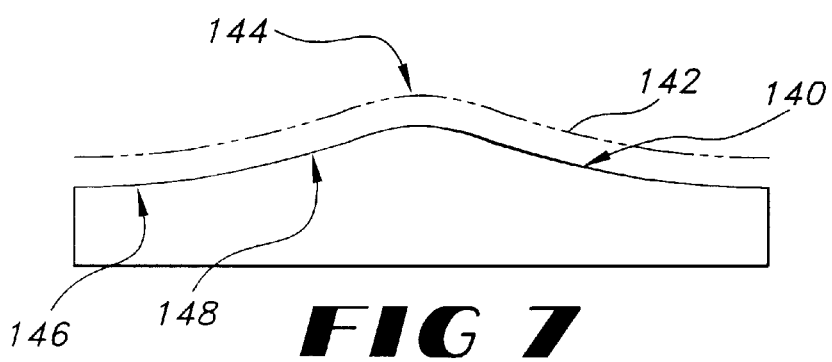
FIG. 7 is a cutaway view showing the configuration of an alternative erasure construction in accordance with this invention.

The structure of eraser 66 with the protrusion discussed with respect to FIGS. 5–7 also simplifies erasing since the user does not have to press down especially hard with the eraser and protrusion 104 ensures that the whiteboard writing surface under the eraser adequately contacts conductive surface 60. Flat eraser 67 must be pressed harder and if improperly used may only contact on part of the conductive surface making it difficult for the electronics to predict the extent of the information actually being erased as shown at 69.

Filter software/firmware 54, FIG. 1 in accordance with this invention operates to reduce the number of data entry errors which can occur as shown in FIGS. 9–12. In the example shown in FIG. 9, the user has contacted whiteboard surface 14 at point $P_1$ with a writing instrument such as a pen but then inadvertently places his or her hand at position $P_2$. Without the filter software/firmware of this invention, touch $P_2$ would be recorded by whiteboard electronics 42 as a valid entry. Actually, a point midway between $P_1$ and $P_2$ (the average) would be recorded since two simultaneous points cannot be detected. In this invention, however, if the distance $\Delta d$ between points $P_1$ and $P_2$ are greater than a pre-set maximum allowable distance and points $P_1$ and $P_2$ occur within a certain pre-established time interval $\Delta t$, point $P_2$ is rejected. Thus, it was realized, that normal writing and erasing operations do not typically involve two fairly distant contacts on whiteboard surface 14 within a very narrow time frame. This being the case, all fairly distant and narrow time frame sequential contacts on the whiteboard surface can be filtered out.

Figure 10:
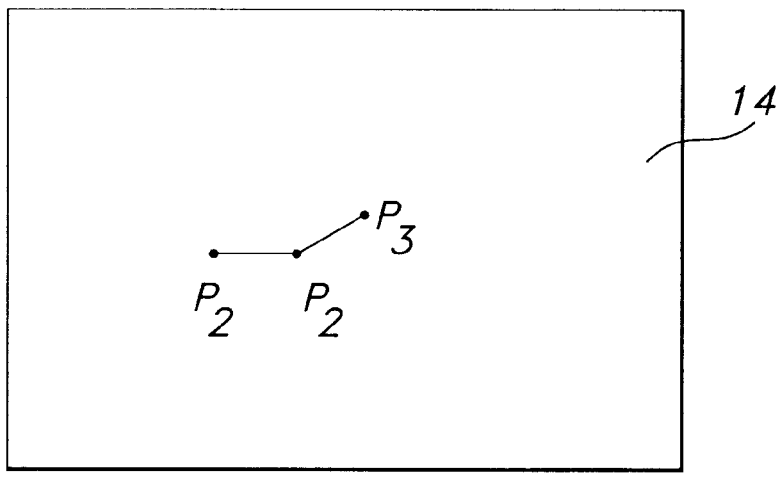
FIG. 10 is a graphical depiction of another type of inadvertent contact with the whiteboard also filtered out by the control system of this invention.

Another scenario involves sequential contacts on the whiteboard surface 14, FIG. 10, not so far apart from each other, but involving a serious change of velocity. For example, the user may place his hand on surface 14 at point $P_3$ while drawing from point $P_1$ to point $P_2$ and there will be a very large sudden change in velocity from point $P_2$ to point $P_3$ when compared to the velocity from point $P_1$ to point $P_2$. Since normal writing actually does not usually involve such large changes in velocity, the subject invention rejects point $P_3$ because of the large and sudden change in velocity even though the overall distance between point $P_2$ and point $P_3$ is not large enough to meet the of rejection criteria discussed with respect to FIG. 9.

In this invention, each touch point computed by the electronics 42, FIG. 1 during a touch detect event is passed through a velocity and acceleration filter implemented in filter 54 to verify that the point represents a valid drawing event. A typical touch event would be the user drawing on the whiteboard with a marker or eraser. Examples of invalid events include situations where the user touches the whiteboard with his hand while drawing with a pen, contact by an object much too large to be a pen or eraser, or electrical noise generated by outside influences beyond the control of the electronics. These events are typically detected by examining the change in velocity between two adjacent distance increments. A distance increment is the change in distance between two adjacent points. While rapid movement of a touch event can produce a relatively high apparent velocity, it is unlikely to produce a large acceleration. In contrast, an undesired event involving a subsequent touch produces an extremely large acceleration.

When the electronics first detect contact on the sensor, a touch detect event is established. As long as the contact writing or erasing continues, the touch detect remains valid. When contact ends, the touch detect event becomes invalid, no more points are measured, and the system waits for another touch detect event. Points are measured as long as touch detect is valid. The first point measured after touch detect is denoted as $P_1$ and contains coordinates $x_1$, $y_1$ and time $t_1$. The second and subsequent points are denoted as $P_2$, $P_3$, etc. Point $P_2$ is compared to $P_1$ to determine if the distance traveled vs. time interval, i.e. velocity, exceeds a pre-set threshold. If so, the second point $P_2$ is rejected and data collection either continues by re-measuring $P_2$ or by exiting with an error code. If not, then point $P_2$ is accepted and point $P_3$ is compared to $P_2$ to determine if the next velocity exceeds the same pre-set threshold. Once three valid points are established, then the two velocities, from $P_1$ to $P_2$ and $P_2$ to $P_3$ are compared to determine if an invalid acceleration occurred. If the acceleration value is greater than a specific limit, then the sequence of points is rejected and data collection either continues by re-measuring $P_2$ and $P_3$ or by exiting with an error code. Exiting is preferable because if the error is due to a discontinuous touch, such as the user putting their hand on the board, once the event has stabilized, velocities and accelerations will return to near zero values but the event will exist. If not, then point $P_3$ is accepted as valid, and the process continues by assigning $P_2$ to $P_1$, and $P_3$ to $P_2$, and then measuring a new $P_3$. Three points are needed to complete each test cycle. This process continues until sensor contact is broken.

If a point is rejected by the filter, then the system normally ceases to measure data until contact with the whiteboard is re-established. For example, if the user puts a hand on the touch surface while drawing, the filter will reject the next several data points because there will be a very large sudden change in velocity (high acceleration). However, if the user does not significantly move the hand, then the acceleration will reverse and the data will appear to be valid again. Therefore, once data fails the test for one or several points, the rest of the touch event may be considered suspect.

Because the process of erasing involves moving a large object (approximately 3" diameter) over the writing surface, the range of accelerations usually generated are typically much larger than when writing with a pen. Therefore, the limits for the filter are modified when the system is in an erase mode, i.e. when an erase action has been selected.

Figure 11:
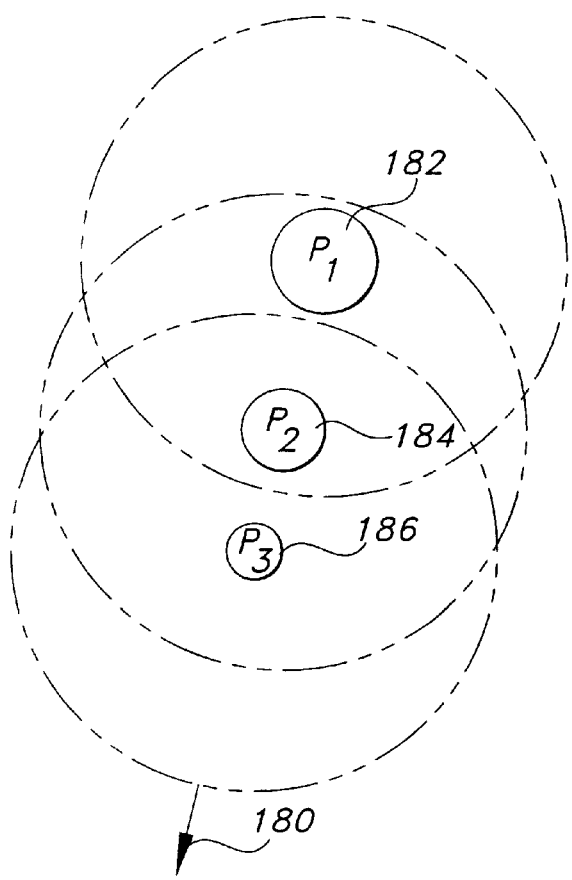
FIG. 11 is a schematic view showing the possible variations in contact pressure between the eraser and the whiteboard surface as the user moves the eraser illustrating the need to relax or otherwise change the filter constraints of the electronic whiteboard control system of this invention for erasing actions.
Figure 12:
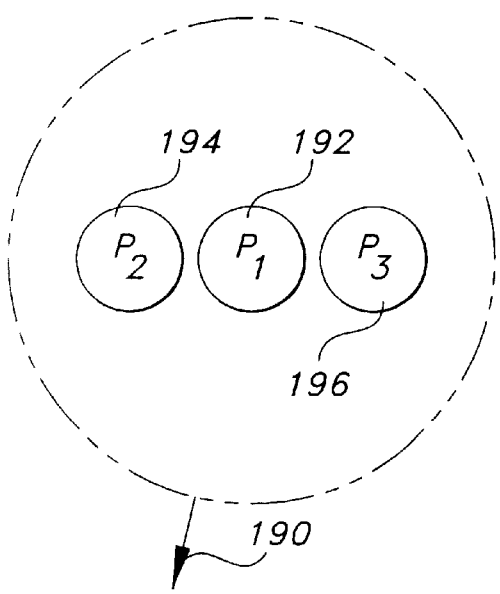
FIG. 12 is a schematic view of the different possible pressure points which can occur during erasing also illustrating the need to change or relax the filter constraints of the control system in accordance with this invention.

For example, as the eraser moves in the direction shown by arrow 180, FIG. 11 there may be variations in the pressure applied to the eraser resulting in different contact points $P_1$ 182, $P_2$ 184, and $P_3$ 186. If the maximum change in velocity limits are not relaxed somewhat from the writing event criteria discussed above, point $P_3$ 186 may be improperly rejected when in fact it is valid erased data. Also, the user may rock the eraser as it moves in the direction shown by arrow 190, FIG. 12 resulting in the center of the erasure making firm contact with the whiteboard surface as shown for $P_1$ 192 and then the edges of the eraser quickly and alternately contacting the writing surface as shown for points $P_2$ 194 and $P_3$ 196. Again, points $P_2$ and $P_3$ may be rejected if the maximum change in writing velocity discussed above with reference to FIG. 10 is not relaxed somewhat during the erasing mode.

Accordingly, this invention features a control system residing in software or firmware as a portion of whiteboard electronics 42 and filter software/firmware 54, FIG. 1 which detects movement of an object such as a pen or eraser across whiteboard 12, FIG. 1 which detects and stores the location coordinates of the object on the whiteboard as it moves across the whiteboard and unique filtering means discussed in more detail with reference to FIGS. 14A and 14B. Such a control system is programmed in accordance with the flow chart shown in FIG. 13. Upon detecting a touch on the whiteboard, step 200, a determination is made whether the contact is in the drawing area as shown at 14, FIG. 1, or instead is in the function touch key area 18. If the contact is in the drawing area, a check is made to ascertain whether the mode selected is the erase mode or one of the draw modes indicated by function touch keys 22–28, step 204, FIG. 13. If the draw mode is selected, a draw sound is generated, step 206 and transmitted over speakers 46, FIG. 1. For example, a clicking sound may be generated similar to the sound made by a cursor moving across a traditional personal computer screen to provide positive feedback that the user is indeed in the correct mode when writing on the whiteboard.

The pre-established maximum allowable distance and change in velocity filter values for the draw mode are then set, step 208, FIG. 13 and processing continues, step 210 to collect and filter the writing data discussed in more detail with reference to FIG. 14. This continues for so long as some object is making contact with the writing surface, step 212 and thereafter the data is assembled, step 214 and added to storage, step 216, for example, memory 52, FIG. 1 and the display is then updated, step 218 whereupon processing resumes at step 200.

In the erase mode, processing is similar except that a different sound is made at step 220 such as a buzzing or humming sound to again provide positive feedback to the user informing her that she is actually in the erase mode. The pre-established maximum allowable distance and change in velocity limits are relaxed somewhat, step 224, for the reasons discussed with reference to FIGS. 11 and 12, and then the writing data is collected and filtered, step 230, again discussed in more detail with reference to FIGS. 14A and 14B. At the end of a touch, step 232 the data is assembled, step 234 and processing then continues to step 216 as previously discussed.

Figure 13:
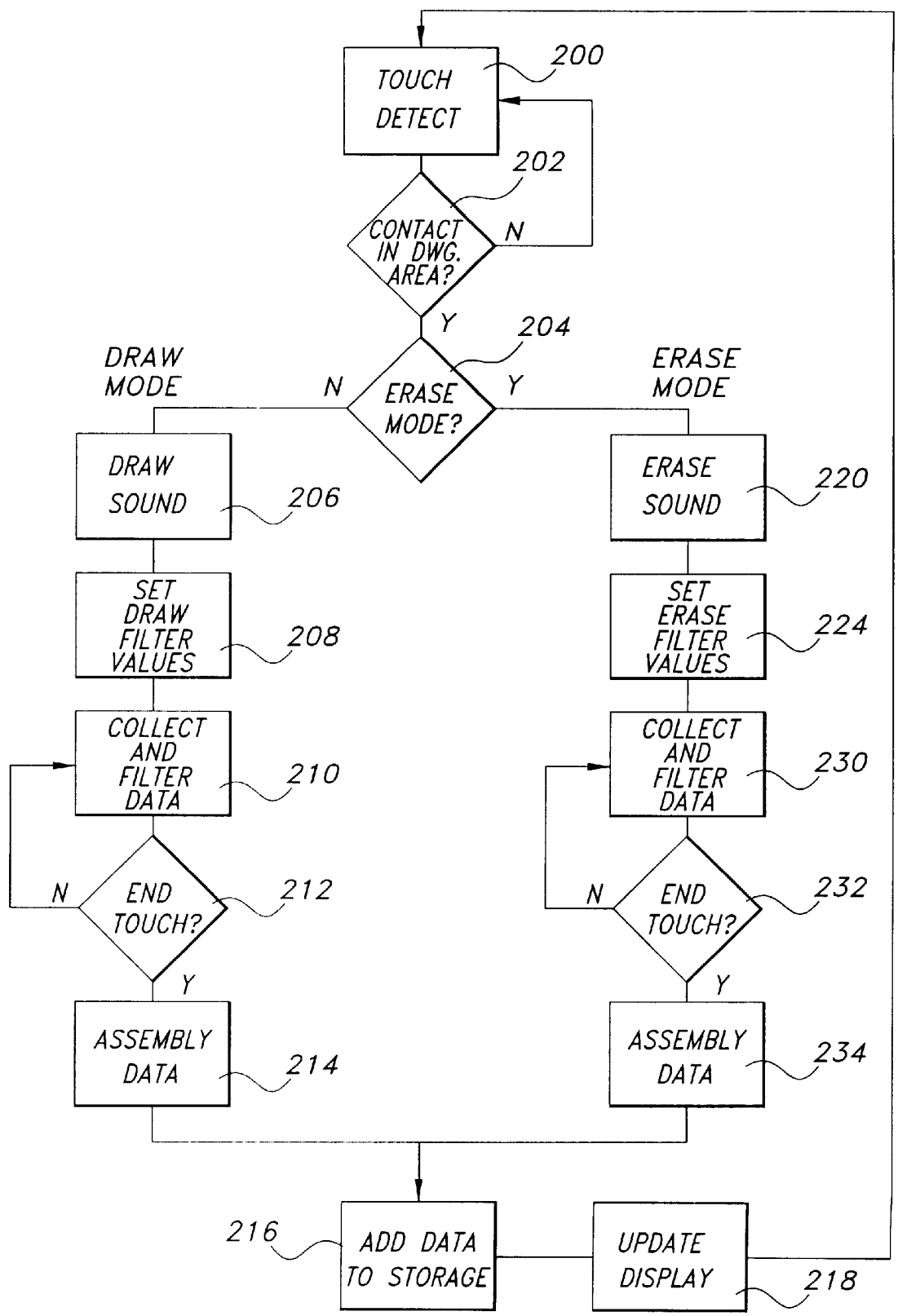
FIG. 13 is a flow chart depicting the operation of the software or firmware associated with the control system of this invention.
Figure 14A:
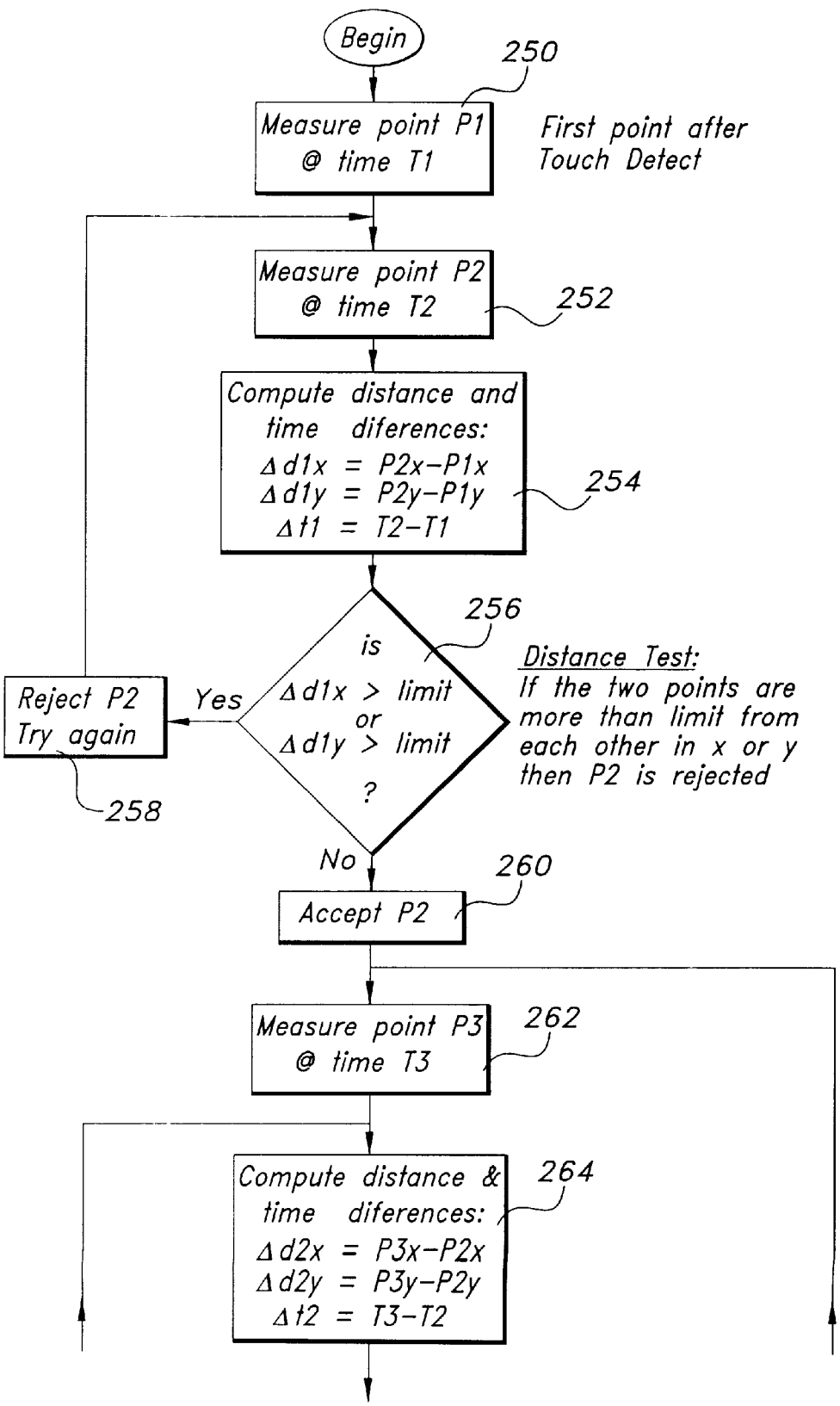
FIGS. 14A and 14B illustrate is a flow chart of the filter function software or firmware component of the control system shown in FIG. 13.
Figure 14B:
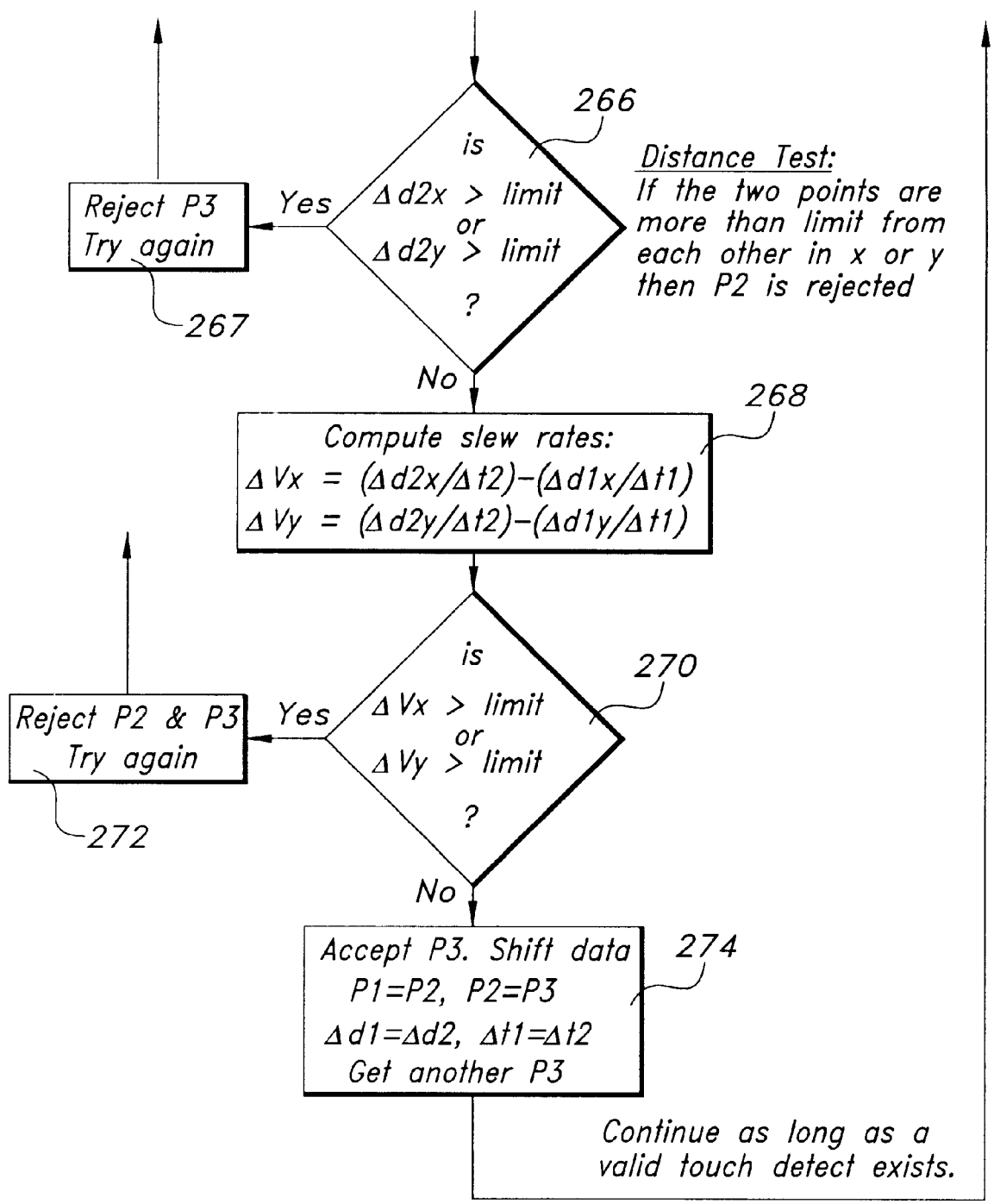

The filtering routine discussed at steps 210 and 230, FIG. 13 are discussed in more detail with the reference to the flow chart shown in FIGS. 14A and 14B the following (wherein FIG. 14B is a continuation of the flowchart of FIG. 14A, and wherein hereinafter either or both FIGS. 14A and 14B may also be referred to simply as FIG. 14) depicting filtering means, namely a filter function embedded in software/firmware. After touch detection, the point is measured in x and y coordinates. Coordinates are typically generated at 200 coordinates per second and sequential coordinates representing movement greater than 1.0 inches in a 0.005 second time frame are deemed to be stray points eliminated by the filter function shown in FIG. 14 and as discussed with reference to FIG. 9. Accordingly, after points $P_1$ and $P_2$ are measured, steps 250 and 252, the distance and time difference between both points are measured, step 254. If either the x or the y pre-established maximum allowable distance is exceeded, step 256, point $P_2$ is rejected, step 258 and another point $P_2$ is measured. If the limit is not exceeded, point $P_2$ is accepted, step 260. The third point ($P_3$) is then measured, step 262 and now the difference in distance between points $P_3$ and $P_2$ within the specified time interval is computed, step 264 and again point $P_3$ is rejected, steps 266 and 267 if the maximum allowable distance is exceeded to account for the erroneous data entry condition which occurs as discussed with reference to FIG. 10. When there is a very large sudden change in velocity, the change in velocity representing the change in how fast the movement was from point $P_1$ to point $P_2$ as compared to the movement from point $P_2$ to $P_3$ is computed, step 268 and if the limit in either direction is exceeded, step 270, points $P_2$ and $P_3$ are typically rejected, step 272. Otherwise, point $P_3$ is accepted, step 274 and each point is truncated ($P_1$ is set equal to $P_2$ and point $P_2$ is set equal to $P_3$), $\Delta d_1$ is set equal to $\Delta d_2$ and $\Delta t_1$ is set equal $\Delta t_2$ so that another point $P_3$ can be measured and evaluated.

In the preferred embodiment, for a 24" by 36" system generating 200 touch points per second, each point representing a fixed time interval of 5 milliseconds, the pre-established maximum allowable distance as represented by the limits shown in steps 256 and 266 is between 0.2 and 2 inches. one inch is preferred. The maximum allowable change in velocity shown in step 270, FIG. 14 in the preferred embodiment is between 40 and 120 in/sec$^2$ (typically 100) in the writing mode and between 320 and 960 (typically 800) in the erasing mode. These values will change for different size sensors, different or variable time intervals, and different touch point per second capacities.

A person could, however, be writing really fast but the writing would still likely have a small incremental acceleration. Therefore, the algorithm described above could be modified such that when a series of points fails the velocity test, they are still passed on to the acceleration filter. If they then pass the acceleration test, they are accepted. If the points pass the initial velocity test, then there is no need to perform the acceleration test at all. Then the velocity limit would be set much lower, i.e. around 60 inches/second or 0.3 inches/point. This is acceptable because every rejected point has a second chance of acceptance if it meets the acceleration criteria. This process tends to err on the side of sometimes accepting more erroneous events as though they were valid drawing events. The second approach also tends to be faster to implement in firmware because the majority of points are only tested once.

In summary, each touch point computed by the electronics during a touch detect event is passed through a velocity and/or acceleration filter to verify that the point represents a valid drawing event. A typical touch event would be the user drawing on the sensor with a marker or eraser. Examples of invalid events include situations where the user touches, the sensor with his hand while drawing with a pen, contact by an object much too large to be a pen or eraser, or electrical noise generated by outside influences beyond the control of the electronics. These events are filtered by filtering means represented by FIG. 14 which examine the change in velocity between two adjacent distance increments. A distance increment is the change in distance between two adjacent points. While rapid movement of a touch event can produce a relatively high apparent velocity, it is unlikely to produce a large acceleration. In contrast, an undesired event such as a second touch will produce an extremely large acceleration.

When the electronics first detect contact on the sensor, a touch detect event is established. As long as the contact (drawings, etc.) continues, the touch detect remains valid. When contact ends, touch detect becomes invalid, no more points are measured, and the system waits for another touch detect event. Points are measured as long as touch detect is valid. The first point measured after touch detect is denoted as $P_1$. The second and subsequent points are denoted as $P_2$, $P_3$, . . . etc. Point $P_1$ is compared by means for calculating, step 254 and the means for comparing, steps 256 and 266 to $P_2$ to determine if the distance traveled vs. time interval, i.e. velocity, exceeds a rational threshold. If so, the second point is rejected and data collection either continues by re-measuring $P_2$ or by exiting with an error code. If not, then point $P_2$ is accepted and point $P_3$ is compared to $P_2$ to determine if the next velocity exceeds a rational threshold. Once three valid points are established, then the two velocities, $P_1$ to $P_2$ and $P_2$ to $P_3$, are compared by means for computing, step 268 to determine the acceleration of the data. If this value is greater than a specific limit, as determined by the means for rejecting, step 270, then the sequence of points is rejected and data collection either continues by re-measuring $P_2$ and $P_3$ or by exiting with an error code. If not, then point $P_3$ is accepted as valid, and the process continues by assigning $P_2$ to $P_1$, $P_3$ to $P_2$, and measuring a new $P_3$. Three points are needed to complete each test cycle. This process continues until sensor contact is broken.

If a point is rejected by the filtering means, then the system normally ceases to measure data until contact with the sensor is again re-established. For example, if the user puts their hand on the touch surface while drawing, the filter will reject the next several data points because there will be a very large sudden change in velocity (high acceleration). However, if the user does not significantly move their hand, then the acceleration will reverse and the data will appear to be valid again. Therefore, once data fails the test for one or several points, the rest of the touch event must be considered suspect.

Because the process of erasing involves moving a large object (approximately 3" diameter) over the sensor surface, the range of accelerations generated are much larger than when writing with a pen. Therefore, the limits for the filter are modified when the system is in "erase mode", i.e. when an erase action has been selected.

Thus, many of the data recording errors associated with writing and erasing actions on an electronic whiteboard are eliminated by use of a circular and therefore orientation independent eraser with a central pointed protrusion which insures a positive initial contact of the eraser with the whiteboard. The electronic filter also detects and filters out errant data relating to contacts with the whiteboard not predictably associated with normal writing or erasing actions. The filter constraints are changed and usually relaxed somewhat for erasing actions since people use an eraser in a fashion different than they use a writing instrument. The cumbersome prior art whiteboard erasing function wherein the user must first draw a circle around the writing to be erased in order for that writing to be electronically deleted is eliminated by the use of above described circular eraser with the central protrusion in conjunction with software or firmware which detects the occurrence of the user erasing the actual writing on the whiteboard and then simultaneously and which automatically also erases or marks the stored electronic data representing the actual writing thereby rendering the electronic whiteboard more user friendly since writing and erasing, from the viewpoint of the user, occurs just as if the user was writing on a chalkboard. Finally, the audible feedback provides the user with a positive indication that he is the correct erasing or writing mode. A portion of the relevant code for accomplishing the filtering function is as follows. The following code fragment is an example of this algorithm in use. Not all steps are shown. In this example, the time between measured points is essentially constant, i.e. constant data sampling rate. Therefore, the Δt values do not need to be computed.

In this sequence, the variable delta_x, delta_y, are assigned the values of $P_{3x}-P_{2x}$ and $P_{3y}-P_{2y}$, respectively. The values for $P_{2x}-P_{1x}$ and $P_{2y}-P_{1y}$ are saved in Q.Data.screen.delta_x and Q.Data.screen.delta_y, respectively. The value for the acceleration that is stored in slewlimit and varies speed on whether the system is in erase mode or draw mode. The normal limit is multiplied by 8 for erasing events. After the test is performed and the results saved, the current delta_x , delta_y, values are saved as the prior values.

Other embodiments will occur to those skilled in the art and are within the following claims:

What is claimed is:

1. A control system for an electronic whiteboard, the control system comprising:
   means for detecting and storing the location coordinates of an object on the whiteboard as it moves across the whiteboard; and
   filtering means, responsive to the means for detecting, including:
      means for calculating the distance between first and second sequential location coordinates,
      means for determining the time interval between the first and second sequential location coordinates,
      means for comparing the calculated distance to a pre-established allowable maximum distance for the time interval, and
      means for rejecting the second location coordinate if the calculated distance is greater than the pre-established maximum allowable distance for the time interval to filter out inadvertent contacts with the whiteboard.

2. The control system of claim 1 in which the filtering means further includes:
   means for computing the change in velocity between three sequential coordinates, and
   means for rejecting the third coordinate if the change in velocity is greater than a pre-established maximum allowable change in velocity.

3. The control system of claim 2 further including:
   means for inputting the type of object to be moved across the whiteboard, and

```
/* --- Check if slew (acceleration) is within acceptable limits --- */
   if( | Slew_off )                            /* is slew check disabled?        */
   {
      /* get the current velocity */
      delta_x = Q.Data.screen.xgrad_raw - Q.Data.screen.xgrad_old;
      delta_y = Q.Data.screen.ygrad_raw - Q.Data.screen.ygrad_old;
      slew.limit = Q.Data.Block1.SlewLimit;    /* get copy of slew limit         */
      if ( erasing )                           /* increase the limit if user is  */
      {                                        /* erasing                        */
         slewlimit <<= 3;
      }
      /* Calculate acceleration vectors and compare to limit                     */
      if (abs(delta_x - Q.Data.screen.delta_x) > skewlimit
         || abs(delta_y - Q.Data.screen.delta_y) > slewlimit)
      {
         TouchState &= -SLEWCHK;               /* we failed slew check           */
         if(TouchState & FNGRDWN)              /* once touchdown has been        */
         {                                     /* confirmed, use old raw data    */
            return (FALSE);                    /* when slew check fails.         */
         }
         else                                  /* otherwise (not touching down)  */
         {                                     /* keep the current raw data.     */
            return(TRUE);                      /* Note: data assignment is in    */
         }                                     /* calling routine                */
      }
      Q.Data.screen.delta_x = delta_x;         /* set previous velocity to       */
      Q.Data.screen.delta_y = delta_y;         /* current velocity               */
   }
   TouchState |= SLEWCHK;                      /* we passed slew check           */
   return(TRUE);                               /* everything passed              */
}
```

Although specific features of this invention are shown in some drawings and not others, this is for convenience only as each feature may be combined with any or all of the other features in accordance with the invention.

means for changing the maximum allowable change in velocity depending on the type of object.

4. The control system of claim 3 further including means for generating a first sound for a first type of object type and a second sound for a second type of object to provide positive feedback to the user of the whiteboard regarding the type of action occurring on the whiteboard.

5. The control system of claim 1 in which the pre-established maximum allowable distance is between 0.2 and 2 inches for a time interval of approximately 5 milliseconds.

6. The control system of claim 2 in which the pre-established maximum allowable change in velocity is between 40 and 120 inches per second squared when the instrument type is a writing instrument and a pre-established maximum allowable change in velocity is between 320 and 960 inches per second squared when the instrument type is an erasing instrument.

7. The control system of claim 1 in which the means for determining the location coordinates includes means for computing the cartesian coordinates of the object, the means for calculating the distance includes means for computing the distance in the x direction and the distance in the y direction between the first and second sequential location coordinates, and the pre-established maximum allowable distance includes a maximum allowable x distance and a maximum allowable y distance.

8. The control system for claim 7 in which the means for computing includes means for evaluating the distance in the x direction in relation to the maximum allowable x distance and for evaluating the distance in the y direction in relation to the maximum allowable y distance and wherein the means for rejecting includes means for eliminating the second location coordinate if either the maximum allowable x or the maximum allowable y distance is exceeded.

9. The control system of claim 2 in which the means for computing the change in velocity includes means for calculating the change in velocity in the x direction and the change in velocity in the y direction, the pre-established allowable maximum change in velocity includes a maximum allowable change in velocity in the x direction and a maximum allowable change in velocity in the y direction, and the means for rejecting the third coordinate includes means for excluding the third coordinate if either the maximum change in velocity in the x direction or the y direction is exceeded.

10. A control system for an electronic whiteboard, the control system comprising:
  means for inputting whether a writing instrument or an erasing instrument is to be used on the whiteboard;
  means for detecting contact of the instrument with the whiteboard;
  means for detecting and storing the location coordinates of the instrument on the whiteboard as it contacts the whiteboard; and
  filtering means, responsive to the means for determining, including:
    means for calculating the distance between first and second sequential location coordinates,
    means for specifying the time interval between first and second sequential location coordinates,
    means for comparing the calculated distance to a pre-established allowable maximum distance for the specified time interval,
    means for rejecting the second location coordinate if the distance is greater than a pre-established maximum allowable distance for the specified time interval,
    means for computing the change in velocity between three sequential coordinates, and
    means for rejecting the third coordinate if the change in velocity is greater than a pre-established allowable change in velocity to filter out contacts made with the whiteboard by objects other than the writing or erasing instruments; and
  means, responsive to the means for inputting, for changing the pre-established maximum allowable change in velocity depending on the type of instrument inputted.

11. An electronic filter for an electronic whiteboard comprising:
  first rejection means, responsive to sequential contacts on the whiteboard which exceed a maximum allowable distance within an established time period, for rejecting at least one of the contacts; and
  second rejection means, responsive to sequential contacts on the whiteboard which exceed an established maximum allowable change in velocity, for rejecting at least one of the contacts.

12. A control method for an electronic whiteboard, the control method comprising:
  detecting and storing the location coordinates of an object on the whiteboard as it moves across the whiteboard; and
  filtering certain errant contacts with the whiteboard wherein filtering includes:
    calculating the distance between first and second sequential location coordinates,
    determining the time interval between the first and second sequential location coordinates,
    comparing the calculated distance to a pre-established allowable maximum distance for the time interval, and
    rejecting the second location coordinate if the calculated distance is greater than the pre-established maximum allowable distance for the time interval to filter out inadvertent contacts with the whiteboard.

13. The control method of claim 12 in which filtering further includes:
  computing the change in velocity between three sequential coordinates, and
  rejecting the third coordinate if the change in velocity is greater than a pre-established maximum allowable change in velocity.

14. The control method of claim 13 further including:
  inputting the type of object to be moved across the whiteboard, and
  changing the maximum allowable change in velocity depending on the type of object.

15. The control method of claim 14 further including generating a first sound for a first type of object type and generating a second sound for a second type of object to provide positive feedback to the user of the whiteboard regarding the type of action occurring on the whiteboard.

16. The control method of claim 12 in which the pre-established maximum allowable distance is between 0.2 and 2 inches for a time interval of approximately 5 milliseconds.

17. The control method of claim 13 in which the pre-established maximum allowable change in velocity is between 40 and 120 inches per second squared when the instrument type is a writing instrument and a pre-established maximum allowable change in velocity is between 320 and 960 inches per second squared when the instrument type is an erasing instrument for a time interval of approximately 5 milliseconds.

18. A control method for an electronic whiteboard, the control method comprising:
  inputting whether a writing instrument or an erasing instrument is to be used on the whiteboard;

detecting contact of the instrument with the whiteboard;
determining and storing the location coordinates of the instrument on the whiteboard as it contacts the whiteboard; and
a filtering process including:
   calculating the distance between first and second sequential location coordinates,
   specifying the time interval between first and second sequential location coordinates,
   comparing the calculated distance to a pre-established allowable maximum distance for the specified time interval,
   rejecting the second location coordinate if the distance is greater than a pre-established maximum allowable distance for the specified time interval,
   computing the change in velocity between three sequential coordinates, and
   rejecting the third coordinate if the change in velocity is greater than a pre-established allowable change in velocity to filter out contacts made with the whiteboard by objects other than the writing or erasing instruments; and
changing the pre-established maximum allowable change in velocity depending on the type of instrument inputted.

19. An electronic filtering process for an electronic whiteboard, the filtering process comprising:
   evaluating a plurality of sequential contacts on the whiteboard to ascertain whether a maximum allowable distance between sequential contacts is exceeded within an established time period; and
   evaluating a plurality of sequential contacts on the whiteboard to ascertain whether an established maximum allowable change in velocity is exceeded between the contacts.

20. The filtering process of claim 19 further including the step of modifying the established maximum allowable change in velocity depending on the type of device contacting the whiteboard.

21. An electric whiteboard system comprising:
   a digitizer including a whiteboard writing surface;
   control electronics for detecting and storing the location coordinates of contacts on the whiteboard to keep a digital record of writings and erasures on the whiteboard; and
   an electronic filter for preventing the storage of digital data relating to contacts wit the whiteboard writing surface not attributable to writing or erasing actions on the whiteboard writing surface.

22. An electronic whiteboard system comprising:
   a digitizer including a writing surface;
   control electronics for detecting and storing the location coordinates of contacts on the whiteboard to keep a digital record of writings and erasures on the whiteboard; and
   filter means for preventing the storage of digital data relating to contacts with the white board not attributable to writing or erasing actions, said filter means comprising:
      means for calculating the distance between first and second sequential location coordinates,
      means for determining the time interval between the first and second sequential location coordinates, and
      means for comparing the calculated distance to a pre-established allowable maximum distance for the time interval.

23. The system of claim 22 in which the filter means further includes:
   means for computing the change in velocity between three sequential coordinates, and
   means for comparing the computed change in velocity to a pre-established maximum allowable change in velocity.

24. An electronic whiteboard system comprising:
   an electronic whiteboard;
   an electronic eraser;
   a storage device for storing data relating to information written on and erased from the whiteboard; and
   an electronic filter for preventing the storage of digital data relating to contacts with the electronic whiteboard not attributable to writing or erasing actions.

25. The electronic whiteboard system of claim 24 in which the filter comprises a calculator for calculating the distance between a first and second sequential location coordinates, a counter for determining the time interval between the first and second sequential location coordinates, and a distance comparator for comparing the calculated distance to a pre-established allowable maximum distance for the time interval.

26. The electronic whiteboard system of claim 24 in which the filter comprises a velocity computor for computing the change in velocity between three sequential coordinates, and a velocity comparator for comparing the computed change in velocity to a preestablished maximum allowable change in velocity.

27. An electronic whiteboard system comprising:
   a digitizer including a whiteboard surface;
   control electronics for detecting and storing the location coordinates of a contact on the whiteboard to keep a digital record of writings and erasures on the whiteboard; and
   a filter for preventing the storage of digital data relating to a contact with the whiteboard not attributable to writing or erasing actions, comprising a calculator for calculating the distance between a first and second sequential location coordinates, a counter for determining the time interval between the first and second sequential location coordinates, and a distance comparator for comparing the calculated distance to a pre-established allowable maximum distance for the time interval.

28. An electronic whiteboard system comprising:
   a digitizer including a whiteboard surface;
   control electronics for detecting and storing the location coordinates of a contact on the whiteboard to keep a digital record of writings and erasures on the whiteboard; and
   a filter for preventing the storage of digital data relating to a contact with the whiteboard not attributable to writing or erasing actions, comprising a calculator for calculating the distance between a first and second sequential location coordinates, a counter for determining the time interval between the first and second sequential location coordinates, and a distance comparator for comparing the calculated distance to a pre-established allowable maximum distance for the time interval, a velocity computor for computing the change in velocity between three sequential coordinates, and a velocity comparator for comparing the computed change in velocity to a pre-established maximum allowable change in velocity.

* * * * *